Nov. 18, 1952 — H. S. ALEXANDER — 2,618,259
TRANSPARENT SLIDE FOR USE IN BINOCULAR VISION TRAINING
Filed Nov. 16, 1949 — 2 SHEETS—SHEET 1
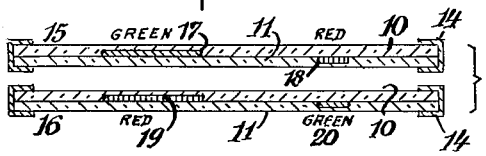
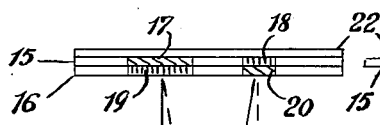
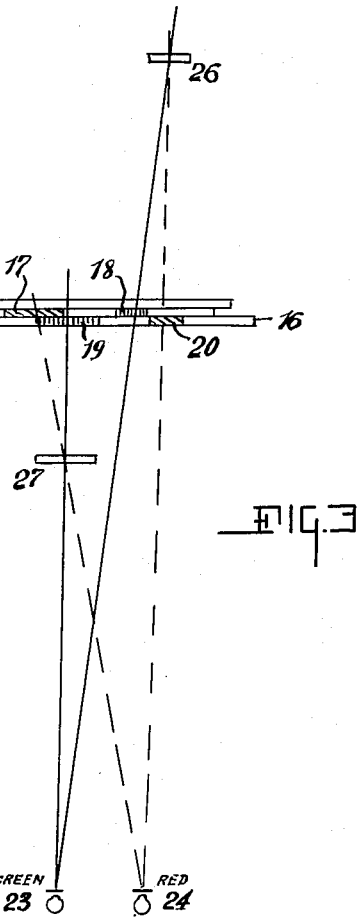
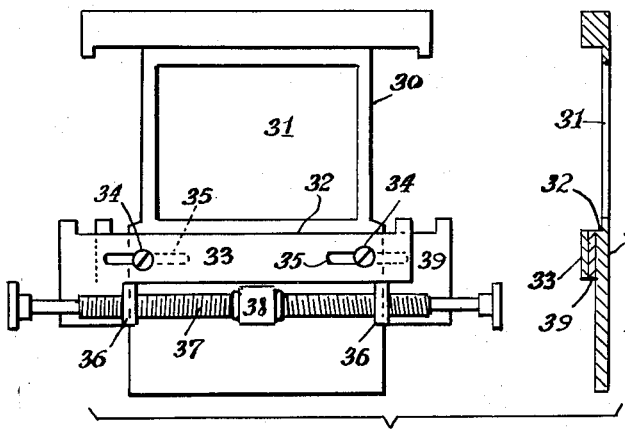

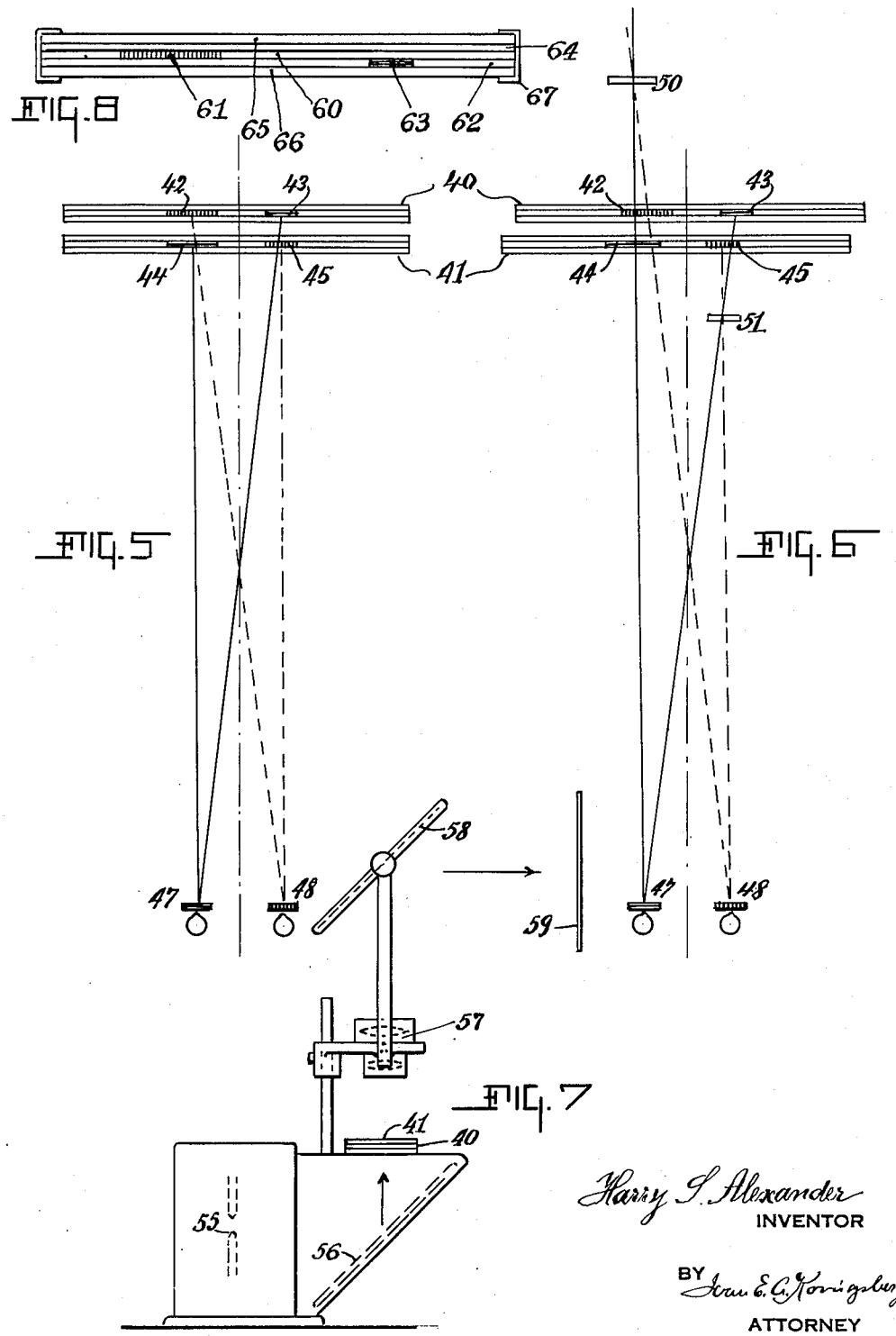

Patented Nov. 18, 1952

2,618,259

UNITED STATES PATENT OFFICE 2,618,259

TRANSPARENT SLIDE FOR USE IN BINOCULAR VISION TRAINING

Harry S. Alexander, Meadville, Pa., assignor to Keystone View Company, Meadville, Pa., a corporation of Pennsylvania Application November 16, 1949, Serial No. 127,688

2 Claims. (Cl. 128—76.5)

The object of this invention is to provide improved transparencies or slides for use in binocular visual training techniques. More particularly the object is to provide a pair of slides on which colored pictures appear to advance or recede optically by a simple transverse movement of one slide relative to the other slide when the slides are viewed through spectacles with opposite lenses in complementary colors. Preferably the colors red and green are used. In certain cases of binocular vision practice polarizing slides may be used and the images projected upon a screen by means of a single projection apparatus.

Each of the first named slides consists of two transparent plates, face to face, one with the green figures, the other with the red figures. Polarizing slides may be made by affixing two polarizing emulsions, one on the vertical axis, the other on the horizontal axis, in superposed offset relation upon a film which is placed between two cover plates. The polarizing slides are viewed through lenses having complementary polarization.

The features and advantages of the invention will be understood from the following specification read together with the accompanying drawings in which Fig. 1 is a diagrammatic view of a pair of colored slides embodying the invention.

Fig. 2 and Fig. 3 are diagrams illustrating the use of the slides and the results obtained as explained above.

Fig. 4 is a composite view in face elevation and details in section of a mechanism which may be used to support and operate the slides.

Figs. 5 and 6 are diagrams illustrating the operation of polarizing slides.

Fig. 7 is an outline view of a projection apparatus for use with either type of slides.

Fig. 8 is a diagrammatic view of a polarized slide embodying the invention.

The slides according to this invention are used in binocular vision training methods which sometimes are called color depth techniques involving the use of three superposed slides. The two front slides bear the colored figures or objects and are movable in opposite directions. The third slide is fixed. The arrangement is such that the third fixed slide forms a fixed target representation within a stereoscopic complement formed by the two front slides when the latter are moved in opposite directions. In some cases the third slide may be a plain glass plate.

Other training techniques use only the colored slides bearing pictorial representations in two complementary colors. When the slides are moved in opposite directions a selected portion of the pictorial representation recedes or advances optically with relation to another selected portion of the same picture. The other selected portion then moves optically in the opposite direction.

With polarizing slides the operation and optical results are similar to those outlined above with the colored slides. In polarizing slides the half tones, shadows and opaque portions of the image are polarized. The rest of the slide or film is transparent.

Fig. 1 illustrates a pair of two-color slides embodying the invention. Each slide consists of two superposed transparent plates 10 and 11 held together by a suitable binding 14 on all sides so as to form a single slide. The two slides are marked 15 and 16, respectively. On the inner face of the plate 10 in slide 15 is placed a green figure 17. On the inner face of the opposed plate 11 is placed a red figure 18, spaced from the figure 17. The slide 16 bears the same figures in the same positions but reversed in the complementary colors as shown as red at 19 and green at 20.

For example, the slide 15 may have a green circle and a red dot. Then the slide 16 will have a red circle and a green dot. When the slides are viewed through complementary color spectacles and the slides are moved in opposite directions, the green-red circle will appear to recede or advance optically with respect to the red-green dot or vice versa depending upon the direction of the movements of the slides. Note that only a portion of the picture recedes while another portion advances, and vice versa.

The relative positions and movements of the slides are shown in Figs. 2 and 3. Normally the slides will be placed as shown in Fig. 2 with a third fixed slide 22, if any, behind the two colored slides. The eye positions are indicated using a green lens at 23 and a red lens at 24. The green eye sees only the red images on the slides. The red eye sees only the green images. When the slides are moved transversely by any suitable instrumentality so that they take the positions shown in Fig. 3, the figures 17 and 19 appear optically as advancing and the figures 18 and 20 appear optically as receding. The apparent receding and advancing movements of the figures are indicated at 26 and 27, respectively. If the slides are moved in the opposite directions the reverse effect of the optically movements will be obtained.

Any suitable mechanism may be used to support and operate the slides either for direct viewing or for viewing by projection. Fig. 4 illustrates an embodiment of such a mechanism. It may consist of a base back plate 30 having a viewing opening 31 and a ledge 32 for the support of the third immovable slide. The plate supports two slide cradles 39 and 33 in superposed relation. The cradle 39 supports the rear colored slide 15. The cradle 33 supports the front slide 16. The two cradles are held on the plate 30 by screws 34 fitted in slots 34 in the cradles as shown. Each cradle has a threaded boss 36 through which passes a right and left hand threaded shaft 37. The latter is supported in a bearing 38 on the plate 30 and is thus axially immovable. By rotating the shaft 37 either to the left or to the right, the cradles are moved an equal distance in opposite directions whereby to operate the slides 15 and 16 as explained above.

Figs. 5 and 6 illustrate the use and operation of polarized slides in binocular training practice. Two slides 40 and 41 are placed in superposed relation and a third blank slide, not shown, is placed upon the supporting plate 30 to space the slides from the back plate, see Fig. 4. The slide 40 has a figure 42 polarized in one direction and a second figure 43 polarized at right angles thereto. The second slide 41 has figures 44 and 45 in the same positions as the figures 42 and 43 but polarized in the complementary directions as indicated in the drawing. The slides are viewed through complementary polarized lenses 47 and 48. The horizontal polarized eye at 47 sees only the horizontal polarized figures 43 and 44. The vertical polarized eye at 48 sees only the vertical polarized figures 42 and 43.

If the two slides 40 and 41 are moved in opposite directions as shown in Fig. 6 the viewer will see the larger figures 42 and 44 merging and optically receding to a position shown at 50, whereas the smaller figures 43 and 45 will appear as advancing and occupying a position indicated at 51. By moving the slides 40 and 41 in the opposite directions the movements of the figures in space will be reversed.

Thus, by using polarizing slides in the manner disclosed a changing depth position optically is effected which is of importance in many tests or techniques relating to binocular visual training practice. It is a feature of the invention that the result may be obtained by using a single projection apparatus with the double movement of the polarizing slides. Fig. 7 illustrates a suitable projector for this purpose. The apparatus has a light source at 55. The light rays are reflected upwardly by a reflecting mirror 56. The supporting and operating mechanism 30—39 in Fig. 4 together with the polarizing slides are indicated diagrammatically in Fig. 7 by the two slides 40 and 41, details being omitted for the sake of clarity. The polarizing slides are placed on the projector so that the light beam passes through the slides as will be understood. Above the slide assembly there is a suitable lens assembly 57 and the light rays are finally reflected by another mirror 58 upon a screen 59. The subject views the projected image through the polarizing lenses 47 and 48, while the technician causes the slides to be moved in opposite directions as the case of the subject may require.

Fig. 8 illustrates one embodiment of the polarized slide according to this invention. The slides 40 and 41 may each consist of two polarizing emulsions superposed on one side of an intermediary film placed between two cover plates. For example, an emulsion 60 having a polarized figure 61 and a second emulsion 62 having a complementary polarized figure 63 are superposed upon the intermediary film 64. The latter with the two emulsion layers is placed between two cover plates 65 and 66 and the assembly bound together with a binding edge 67. In Fig. 8 the emulsion layer 60 has the vertically polarized figure 61. The layer 62 has the horizontally polarized figure 63. The slide in Fig. 8 corresponds to the slide 40 in Figs. 5 and 6. The other slide 41 will be constructed in the same manner but with the polarized figures reversed in spaced relation as shown in Figs. 5 and 6. In operation, the light which is projected through the figure 61 to the viewer is polarized in passing through the emulsion 62, while the light projected through the figure 63 is polarized in passing through the emulsion 60.

I claim:

1. In combination, a pair of transparent slides, one of said slides bearing pictorial representations having one portion in one selected color and another portion in a complementary color, the other slide bearing like pictorial representations in the same complementary colors in reverse order or arrangement to the colors on the said first slide, a pair of color-separated spectacles complementary to each of the colors on the said slides for viewing the same, means for movably supporting the said two slides in superimposed relation and for moving said slides an equal distance in opposite directions across the line of view whereby to cause a selected portion of the pictorial representations on said slides to advance or recede optically with relation to the said other portions of the pictorial representations, while the latter are simultaneously therewith caused to recede and advance, respectively, in the opposite direction along the line of view.

2. A pair of two-color slides according to claim 1, one of said pair of slides bearing on its inner faces two separate off-set figures in complementary colors, the other of said pair of slides bearing on its inner faces the same two separate off-set figures in complementary colors in reverse order or arrangement to the colors of the figures on the said first slide.

HARRY S. ALEXANDER.

REFERENCES CITED

The following references are of record in the file of this patent:

UNITED STATES PATENTS

| Number | Name | Date |
| --- | --- | --- |
| 871,103 | Bridge | Nov. 19, 1907 |
| 1,481,006 | Hammond | Jan. 15, 1924 |
| 1,498,743 | Macy | June 24, 1924 |
| 2,019,550 | Turville | Nov. 5, 1935 |
| 2,057,051 | Owens | Oct. 13, 1936 |
| 2,132,670 | Young | Oct. 11, 1938 |
| 2,362,588 | Shepard | Nov. 14, 1944 |
| 2,397,273 | Land | Mar. 26, 1946 |